(12) United States Patent
Rührig et al.

(10) Patent No.: US 6,988,414 B2
(45) Date of Patent: Jan. 24, 2006

(54) SENSOR DEVICE HAVING A MAGNETOSTRICTIVE FORCE SENSOR

(75) Inventors: Manfred Rührig, Eckental (DE); Joachim Wecker, Röttenbach (DE); Alfred Ludwig, Dachau (DE); Eckhardt Quandt, Bonn (DE); Markus Löhndorf, Bonn (DE)

(73) Assignees: Stiftung Caesar Center of Advanced European Studies and Research (DE); Infineon Technologies AG (DE)

( * ) Notice: Subject to any disclaimer, the term of this patent is extended or adjusted under 35 U.S.C. 154(b) by 35 days.

(21) Appl. No.: 10/835,536

(22) Filed: Apr. 29, 2004

(65) Prior Publication Data

US 2004/0216534 A1 Nov. 4, 2004

(30) Foreign Application Priority Data

Apr. 29, 2003 (DE) ......................... 103 19 319

(51) Int. Cl.
*G01L 1/00* (2006.01)

(52) U.S. Cl. ............................. 73/779; 73/763; 73/774; 324/207.21

(58) Field of Classification Search ........... 73/763–779, 73/862, 862.041–862.08, 862.381–862.69; 324/207.21, 209; 338/42
See application file for complete search history.

(56) References Cited

U.S. PATENT DOCUMENTS

| | | | |
|---|---|---|---|
| 5,168,760 A | | 12/1992 | Wun-Fogle et al. |
| 5,534,355 A | * | 7/1996 | Okuno et al. ............... 428/611 |
| 5,856,617 A | | 1/1999 | Gurney et al. |
| 6,381,171 B1 | * | 4/2002 | Inomata et al. ............. 365/173 |
| 6,674,617 B2 | * | 1/2004 | Gill ........................ 360/324.12 |
| 2002/0073785 A1 | * | 6/2002 | Prakash et al. ........ 73/862.041 |
| 2004/0050172 A1 | | 3/2004 | Quandt et al. |

FOREIGN PATENT DOCUMENTS

| | | |
|---|---|---|
| DE | 42 03 124 | 8/1992 |
| DE | 102 27 561 | 5/2003 |
| EP | 1 085 586 | 3/2001 |
| WO | WO 01/06219 | 1/2001 |
| WO | WO 01/06222 | 1/2001 |
| WO | WO 01/73390 | 10/2001 |

OTHER PUBLICATIONS

Article "Special Magetoelastic Sensor" p. 145–147.
Article "Theory of Magnetostriction Amouphous and Polycrystalline Ferromagnets Ferromagnets".
Article, "Magnetostriction of Amorphous Rare-Earth—Fe Alloys".
Article, "Magnetostriction and Other Magnetic Properties of Co–Ni Based Amorphous Alloys".
Article, "Ferromagnetic–insulator–ferromagnetic tunneling and large magnetoresistance in trilayer junctions (invited)".
Article, "Amorphous Ferromagnetic Materials–Magnetic Fundamentals, Properties and Applications".

* cited by examiner

*Primary Examiner*—Edward Lefkowitz
*Assistant Examiner*—Alandra Ellington
(74) *Attorney, Agent, or Firm*—Robert W Becker & Associates; Robert W Becker

(57) ABSTRACT

A sensor device having a magnetostrictive force sensor is provided. To detect a force, the sensor device contains a TMR force sensor element having a magnetic detection layer of material having a magnetostriction coefficient $\lambda \geq |5 \cdot 10^{-6}|$, a magnetically harder reference layer, and a tunnel barrier disposed between these layers. Established in the detection layer is a starting magnetization that relative to the magnetization of the reference layer, which is directed in the direction of force, forms an angle of other than 0° and thus is rotated out of its starting position under the effect of the force.

15 Claims, 5 Drawing Sheets

SENSOR DEVICE HAVING A MAGNETOSTRICTIVE FORCE SENSOR

BACKGROUND OF THE INVENTION

The present invention relates to a sensor device, for detecting a force that acts in a prescribed direction of force, having a magnetostrictive force sensor.

Various sensor devices are disclosed in the book "Sensors", Vol. 5 (Magnetic Sensors), VCR Publishing Company, Weinheim (DE), 1989, pages 145 to 147, where the magnetoresistive effect is combined with other physical effects. Thus, for example, a force sensor is disclosed that takes advantage of the magnetoresistive effect and the Hall effect. For this purpose, there is produced in magnetostrictive components, via a constant current, a magnetic flux that under the effective force leads to a corresponding change in flux. This flux change is detected with a Hall element. Furthermore, the aforementioned book also describes a sensor device with which a magnetostrictive strip is connected with a piezoelectrical transducer. The magnetostrictive strip is magnetized by a DC field that is to be measured. The changing length of the strip connected therewith is converted via piezoelectrical transducer into an electrical measurement signal.

JP 11-251658 A discloses a magnitoresistance element according to which a tractive force is applied to an electrically conductive oxide film in such a way that the film is disposed, via a thin insulating layer, upon a substrate of magnetostrictive material, and the substrate is subjected to a magnetic field.

Pursuant to the not pre-published German Patent Application 102 14 946.1 of Apr. 4, 2002, a TMR sensor is proposed for the measurement of mechanical changes in length, in particular a compression and/or tension sensor that includes a sandwich system having two flat superimposed electrodes of magnetic material. These electrodes are separated by a tunnel barrier, in particular of oxidic material, whereby a current flow is effected between the electrodes through the tunnel barrier. One of the electrodes should be formed by an extension-sensitive, magnetostrictive detection layer in which the share of the anisotropy induced by a mechanical stress is greater than that of the intrinsic anisotropy, whereby during extension relative changes in resistance $\Delta R/R$ of the system of greater than 10% at room temperature develop.

It is an object of the present invention to provide a sensor device having a magnetostrictive force sensor or tension sensor, according to which a specially embodied TMR sensor is utilized that can be produced via known methods in the layer technology, especially thin film technology.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
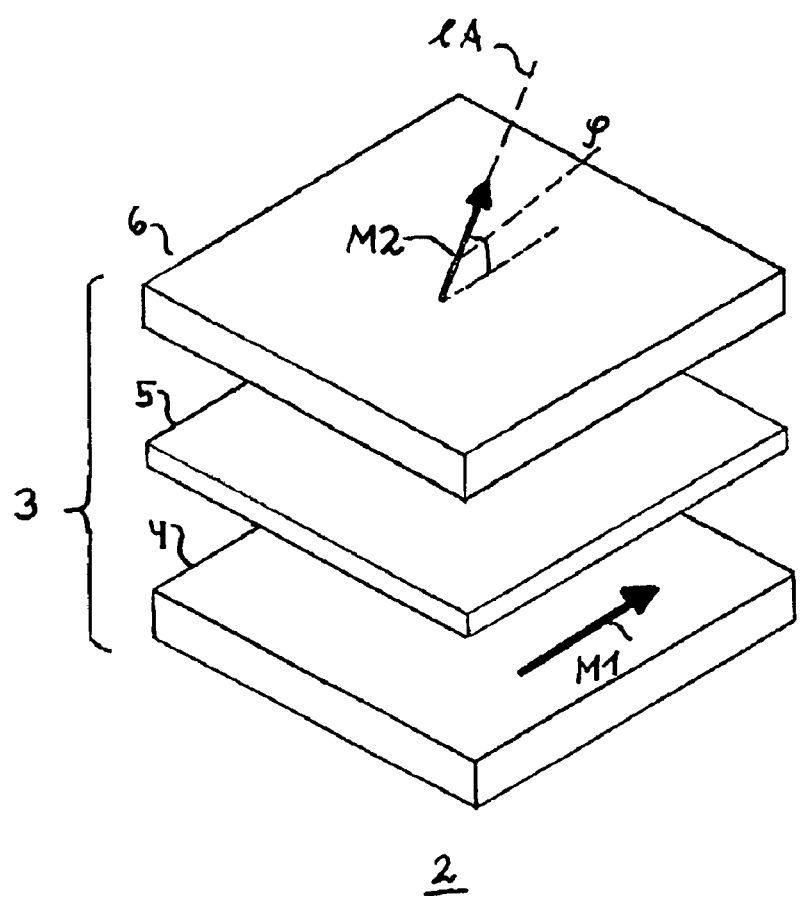
FIG. 1 shows the fundamental construction of a TMR force sensor element for one exemplary embodiment of an inventive sensor device.

The object of the present application is inventively realized in that the sensor device, for the detection of a force that acts in a prescribed direction of force contains a tunnel-magnetoresistive sensor element, as a force sensor element, which is provided with a thin layer system having at least the following components, namely:

a detection layer of magnetic material having a magnetostriction coefficient $\lambda$, where $\lambda \leq |5 \cdot 10^{-6}|$, preferably $\lambda \leq |1 \cdot 10^{-5}|$, a comparatively magnetically harder reference layer or a corresponding reference layer system, an intermediate layer of insulating material, as a tunnel barrier, disposed between these layers, and electrical connections on the reference layer or reference layer system and on the detection layer, whereby in the detection layer a starting magnetization is established that relative to the magnetization of the reference layer or reference layer system, which is directed at least approximately in the direction of force, forms an angle Ø of other than 0°, so that the magnetization of the detection layer is rotated out of its starting position under the effect of the force.

In this connection, the invention proceeds from the consideration that known tunnel-magnetoresistive (TMR) sensor elements can be concretely utilized as force or mechanical tension sensors if for their at least one detection layer a special, generally relatively soft-magnetic material having an adequately high magnetostriction constant is selected, and for its magnetic layers specific starting positions of the magnetizations are selected. Accordingly, with the inventive sensor device it is provided that the tunnel current of its TMR force sensor element changes between two magnetic layers across a non-magnetic, insulating tunnel barrier layer as a function of the externally applied mechanical tension, which can be in the form of tractive, compressive or bending stress.

Known TMR sensor elements have up to now been used for the measurement of the direction of magnetization of a detection layer. In this connection, use has been made of the fact that the direction of magnetization of the detection layer can be influenced by external fields, as a result of which a measurement of the direction or strength of these external fields is possible. If pursuant to the present invention, instead of, as is customary, utilizing a soft magnetic detection layer one utilizes a layer having a relatively high magnetostriction, the possibility is provided in principle that the magnetization of this detection layer, and hence the resistance of such a sensor element, can be changed by an external mechanical tension. There thus results a measurement process for determining corresponding external mechanical tensions.

Pursuant to further advantageous embodiments of the sensor device of the present application, an angle Ø having a value, i.e. a positive or negative value, of at least approximately 90° can be selected. Corresponding force sensor elements can then be utilized as tension sensors or compressive sensors depending upon whether the magnetostriction constant is positive or negative.

It is particularly advantageous if one selects an angle Ø having a value of less than 90°, expediently between 75° and 15°, and preferably at least approximately 45° (+/−5°), excluding the value Ø=0°. Under these circumstances not only tension but also compressive forces can be detected with the sensor elements.

Pursuant to one preferred embodiment of the sensor device, the thin layer system of its TMR force sensor elements is provided on both sides of the reference layer or the reference layer system with a respective detection layer that are separated by a tunnel barrier layer. In this connection, the reference layer system can be designed with two magnetic layers and a non-magnetic intermediate layer disposed between them, whereby the magnetizations in the magnetic layers are oriented anti-parallel relative to one another. Corresponding force sensor elements are characterized by a low coupling between the detection layers and the reference layer system with a simultaneously pronounced signal.

In particular from a linearization standpoint, a sensor device having a plurality of TMR force sensor elements in a bridge connection is advantageously provided.

The detection layer of the thin layer system can have a multi-domain condition. However, it is particularly advantageous if a detection layer of the thin layer system of its TMR force sensor element is embodied with an at least approximately single-domain state, for example by a weak ferromagnetic Néel coupling of the detection layer to the reference layer. Under these conditions, it is possible in a relatively simple manner to produce a sensor device that is sensitive for mechanical stresses having both positive and negative signs.

In general, the starting position of the magnetization of the at least one detection layer is determined by an impressing of the so-called light or easy axis or direction of the magnetization in the detection layer. However, in a manner known per se it is also possible to establish a starting position of the magnetization of the detection layer by a magnetic pre-stressing of the detection layer that deviates from the direction of the axis.

Preferred materials having an adequately high value of the magnetostriction contain cobalt and/or iron and/or nickel, whereby it is to be understood that further components could also be alloyed therewith. In this connection, the material preferably has an amorphous structure.

Other specific features of the present invention will be described in detail subsequently.

Description of Specific Embodiments

Referring now to the drawings in detail, corresponding parts in all of the Figures are respectively provided with the same reference numerals.

FIG. 1, in a vertically exploded perspective view, shows one exemplary embodiment of a TMR sensor element 2, which serves as a force sensor element, for a sensor device of the invention. In this connection, the sensor device can be provided with one or more such force sensor elements. The sensor element 2, which is to be produced by thin layer technology, includes a multi-layer system 3, which in its basic form contains a magnetic reference layer 4, a non-magnetic, insulating intermediate layer 5, as well as a further magnetic layer 6 that contains a detection layer. Thus, the sensor element has a construction that is typical for TMR sensor elements (see, for example, "Journal of Applied Physics" Vol. 79, No. 8, 15.04.1996, pages 4724 to 4729). Fixedly impressed in the reference layer 4 is a magnetization M1, while a (starting) magnetization M2 in the detection layer 6, at a prescribed preferred direction of the magnetization (=position of the so-called "light or easy direction" of the magnetization), is oriented at an angle Ø relative to the magnetization M1. In this connection, the orientation of the magnetization M1 is selected as the reference value for the angle. The reference layer 4 is comparatively magnetically harder than is the detection layer 6. Appropriate sensor elements of the so-called "hard-soft type" (their magnetic layers) are also known as "spin valves". Their reference layer can, in a manner known per se, also be replaced by a layer system that, for example, represents a synthetic anti-ferro magnet (see WO 94/15223 A).

Pursuant to the invention, it is intended that mechanical stresses that act in a prescribed direction of force where Ø=0° be detected with the magnetic detection layer 6. For this purpose, it is embodied as a magnetostrictive portion of a TMR force sensor element 2, that, when there is no force acting, indicates a predetermined starting position of its magnetization M2 (=starting magnetization at a prescribed orientation of the axis IA). The layer 6 therefore comprises one of the known magnetostrictive materials, whereby the magnetostriction coefficient λ thereof should have a value of at least $|5 \cdot 10^{-6}|$, especially at least $|1 \cdot 10^{-5}|$.

For a realization of the magnetostrictive layer of an inventive TMR force sensor element, magnetic layers contain cobalt, iron and/or nickel that have a high magnetostriction coefficient λ are advantageously used. Characteristic for many materials is the dependency of the magnetostriction coefficient of the composition (e.g. measured in atom %) and also of the layer thickness. Thus, for example for $Co_{100}$ the λ is negative, whereas for $Co_{95}Fe_5$ nearly a freedom from magnetostriction is observed. In contrast, $Co_{50}Fe_{50}$ has a positive maximum in the magnetostriction. However, here the layer thickness d is decisive for the absolute magnitude of the magnetostriction coefficient λ. For the theory of magnetostriction in amorphous and polycrystalline material, reference is made to "Journal of Magnetism and Magnetic Material", Vol. 69 (1987) pages 79 to 98. A discussion of the magnetostriction of amorphous rare earth Fe alloys or Co—Ni alloys can be found from the aforementioned journal, Vol. 79 (1989), pages 358 to 364 and Vol. 61 (1986), pages 390 to 394. Furthere magnetostrictive materials can be found in the aforementioned journal, Vol. 9 (1978), pages 191 to 199.

Figure 2:
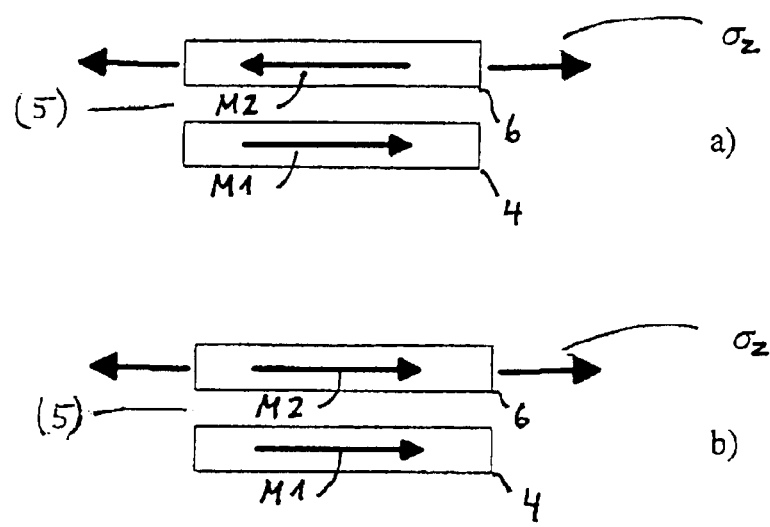
FIGS. 2a and 2b show the force effect upon such a TMR sensor element with parallel and anti-parallel magnetization of its magnetic layers.

In the following, the assumption will be made that the magnetization M1 in the reference layer 4 practically does not change with mechanical stresses. This can be technically realized in several known ways, for example by special exchange or substitute-coupled layers, a small magnetostriction or a large coercivity field intensity. The resistance over a TMR sensor element 2 is maximum if the magnetization M2 in the detection layer 6 has rotated from parallel to the reference layer 4 (low resistance; see FIG. 2b) to antiparallel (high resistance; see FIG. 2a). However, these two states of the detection layer 6 have the same energy for the magnetostriction, since in this connection an effect is involved that is a squared function of the magnetization. In other words, in this case for the two starting positions of the magnetization M2, under a force effect upon the detection layer 6 in the direction of the magnetization M1 of the reference layer 4, e.g. under a corresponding traction $\sigma_z$, only the same measured value is to be detected at the TMR system. In FIG. 2, as well as in the following FIGS. 3, 4 and 8, which have a corresponding representation, the depiction of the tunnel barrier 5 of the TMR layer system between the magnetic layers is dispensed with.

Figure 3:
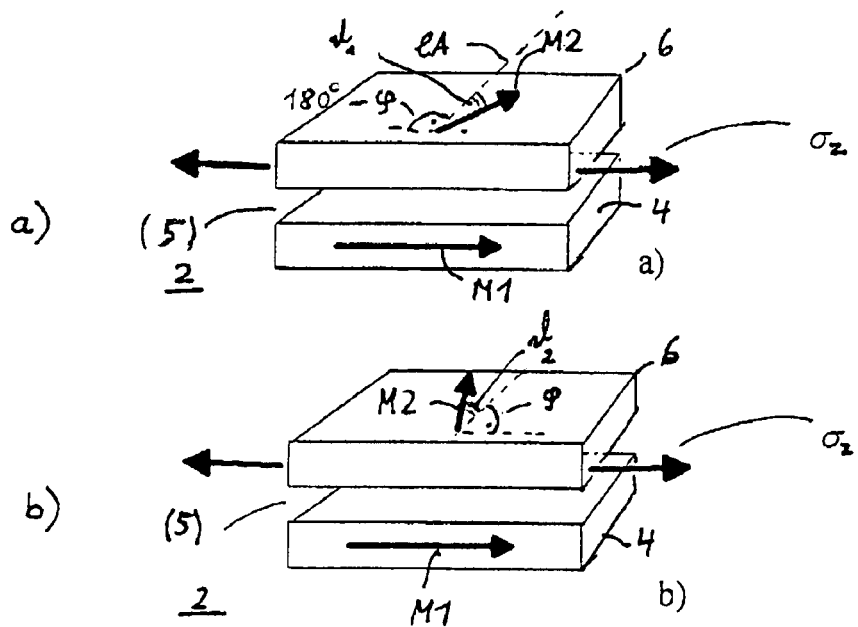
FIGS. 3a and 3b show the force effect upon a corresponding TMR sensor element, yet with magnetization of its magnetic layers perpendicular to one another.

Pursuant to the invention, there is now a possibility for a remedy relative to the aforementioned problem in that established in the detection layer 6 is a starting position of the magnetization M2 that is not parallel to the direction of the magnetization M1 of the reference layer 4, but rather pursuant to the embodiment assumed for FIG. 3 extends perpendicular to the magnetization M1, with $\emptyset=90°$. In this connection, it is assumed for the example that the detection layer 6 has a positive magnetostriction constant $\lambda$. In this case, by means of an applied traction $\sigma_z$, that acts at least approximately in the direction of the magnetization M1 of the reference layer 4, the magnetization M2 of the detection layer 6 rotates out of the original, perpendicular direction, which faces, for example, in the direction of the axis 1A under the angle $\emptyset$, into the direction of the traction $\sigma_z$, in order in this way to reduce the external tension and to pass into a state that is more favorable from an energy standpoint. The corresponding angle of rotation is designated by $\delta_1$. This relative change of the direction of magnetization, however, theoretically does not lead to a change of the resistance at the TMR sensor element, since in a first approximation it has the same energy value, whether the magnetization M2 rotates in a direction toward a parallel (FIG. 3a) or anti-parallel (FIG. 3b) orientation, relative to the magnetization M1, about an angle of rotation $\delta_1$ or an angle of rotation $\delta_2$. The measurement resistance thus remains approximately unchanged. In practice, however, due to a certain amount of coupling that is generally present between the magnetic layers 4 and 6 across the tunnel barrier layer 5, one or the other direction (pursuant to FIG. 3a or 3b) is preferred. This leads in principle to a measurable signal; however, such a sensor element has the limitation that it is sensitive only to either positive or negative stresses—under the assumptions made only positive tensions (=traction $\sigma_z$). Compressive stresses would not lead to a rotation of the magnetization, and hence not to a measurable signal. In other words, corresponding sensor elements could be used only as force sensors for tractive forces.

Conversely, there exists the possibility, by means of a detection layer material having a negative magnetostriction constant $\lambda$, to provide a TMR force sensor element having the previously described starting position of the magnetization M2 that is sensitive to compressive forces. In other words, common to both types of sensor elements is that they can respectively detect only mechanical stresses of either a positive or negative sign, i.e. either only tractive forces or only compressive stresses.

Figure 4:
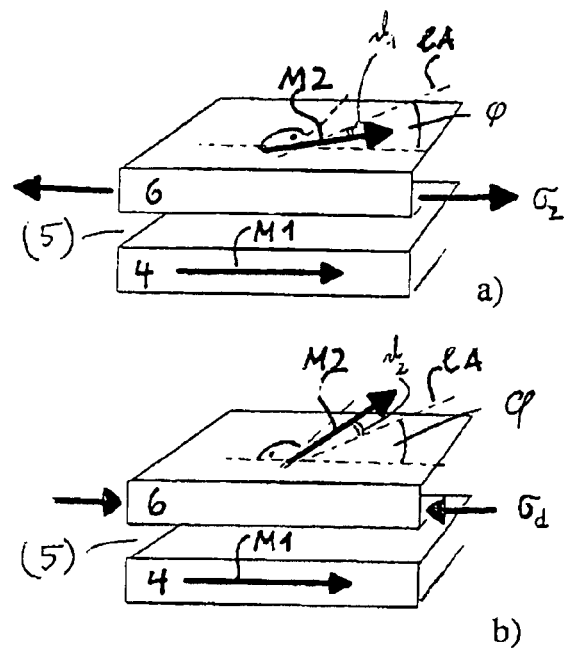
FIGS. 4a and 4b show the force effect with magnetization directions of the magnetic layers that form a special angle Ø.

A particularly advantageous embodiment of a sensor device having an inventive TMR force sensor element is indicated in FIG. 4. With this sensor element, established in the detection layer 6 thereof is a starting position of the magnetization M2 at an angle $\emptyset$ that is neither perpendicular nor parallel to the magnetization M1 of the reference layer 4. In this connection, the starting position can, as assumed with the illustrated embodiment, again coincide with the direction of the axis IA. To establish a starting position that deviates therefrom, a so-called magnetic pre-stress of the magnetization is provided. Such a pre-stress can be produced, in particular, via a certain magnetic coupling at the reference layer 4. Another possibility would, for example, be a pre-stress from an external magnetic field that, for example, is generated by an additional conductive band through which current flows. In other words, with the illustrated embodiment, the value of the angle $|\emptyset|$ should be between 0° and 90° (accompanied by factoring-out of this threshold value). Preferably, an angular value $|\emptyset|$ between 15° and 75°, in particular at least approximately 45° (+/−5°) is provided. In such a case, not only a positive but also a negative mechanical stress $\sigma_z$ or $\sigma_d$ leads to a change of the direction of magnetization (FIG. 4a or 4b), with a rotation of the magnetization M2 out of the starting position (at the angle $\emptyset$) about an angle of rotation $\delta_1$ or an angle of rotation $\delta_2$. These changes proceed with a reduced or increased tunnel resistance.

As a deviation from the case assumed for FIG. 4 of a positive (tractive) force $\sigma_z$ (FIG. 4a) or a negative (compressive) tension ad (FIG. 4b), at simultaneous positive magnetostriction constant $\lambda$, corresponding relationships also result for $\lambda<0$, with reverse positive or negative sign for the tensions and the change of resistance.

Figure 5:
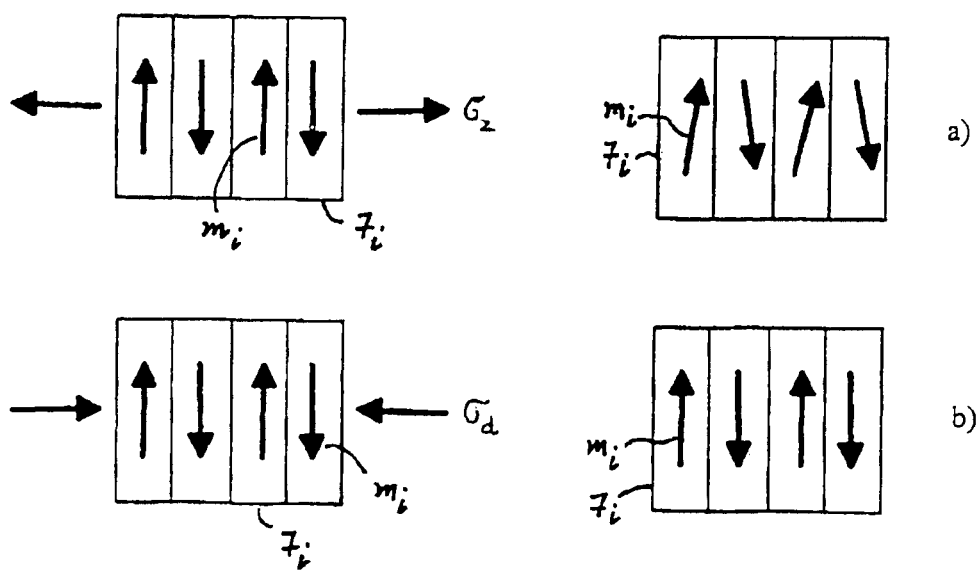
FIGS. 5a and 5b show the change of a multi-domain state in a detection layer of the sensor element assumed in FIG. 3 under the effective force.

In the normal case, the detection layer 6 has multiple domains (see FIG. 5). In the case of perpendicular anisotropy pursuant to the embodiment of FIG. 3 having domains that are magnetized in the direction $\emptyset$ and $-(90°+\emptyset)$, this leads to a rotation of the magnetizations $m_i$ in the individual domains $7_I$ and hence to a change of resistance of the TMR sensor (see FIG. 5a). However, such a sensor element is also again (as in the case pursuant to FIG. 3) sensitive for only either a positive or negative sign of the mechanical stress. In other words, for the case of mechanical stresses having opposite signs, which would here be compressive stresses $\sigma_d$ (see FIG. 5b) no measurement signal results.

Figure 6:
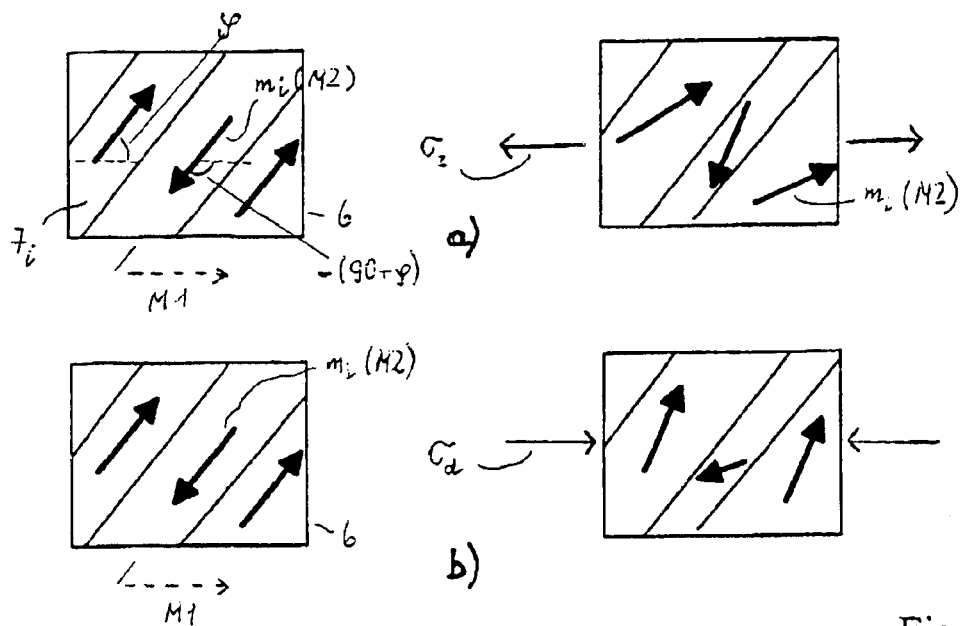
FIGS. 6a and 6b show relationships corresponding to that of FIG. 5 yet with a different orientation of the domains.

Here also a starting position of the magnetization M2 in the detection layer 6, analogous to FIG. 4, leads to an improvement. In this case, which forms the basis of FIG. 6 (with the magnetization M1 as a reference magnitude for the rotation of the magnetization M2 or $m_i$ of the domains $7_I$), although the sensor element is sensitive for magnetic stresses having both a positive or negative sign (see FIGS. 6a and 6b), its sensitivity is not maximal, and due to necessary domain wall shifting also suffers from relatively strong hysteresis.

Figure 7:
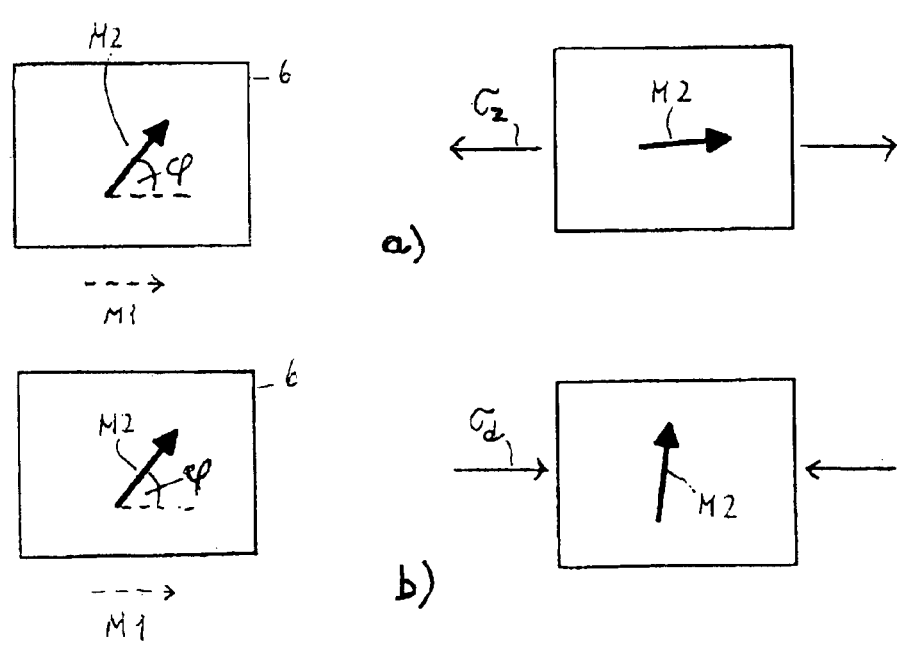
FIGS. 7a and 7b show relationships corresponding to that of FIG. 6 with a single-domain state in the detection layer.

For this reason, a single-domain state of the detection layer 6 pursuant to FIG. 7 is preferably provided. In this case, the change in magnetization in the detection layer 6 (or the single domain) is effected on the basis of external stresses $\sigma_z$ only via rotational processes that are ideally free of hysteresis. In addition, with the starting position of the magnetization M2 of the detection layer 6 under an angle $\emptyset$ to the indicated magnetization M1 of the reference layer 4, the sensor element is sensitive for both signs of the stress (see FIGS. 7a and 7b). Also for this case the magnetization M1 of the reference layer is oriented in the direction of the force effect.

A single domain state pursuant to FIG. 7 can preferably be achieved by taking advantage of the ferromagnetic (Néel—) coupling that is typically present in such thin layer systems.

As with the other cases previously illustrated, here also it is, of course, possible to establish the starting position of the magnetization M2 at an angle $-\emptyset$.

Figure 8:
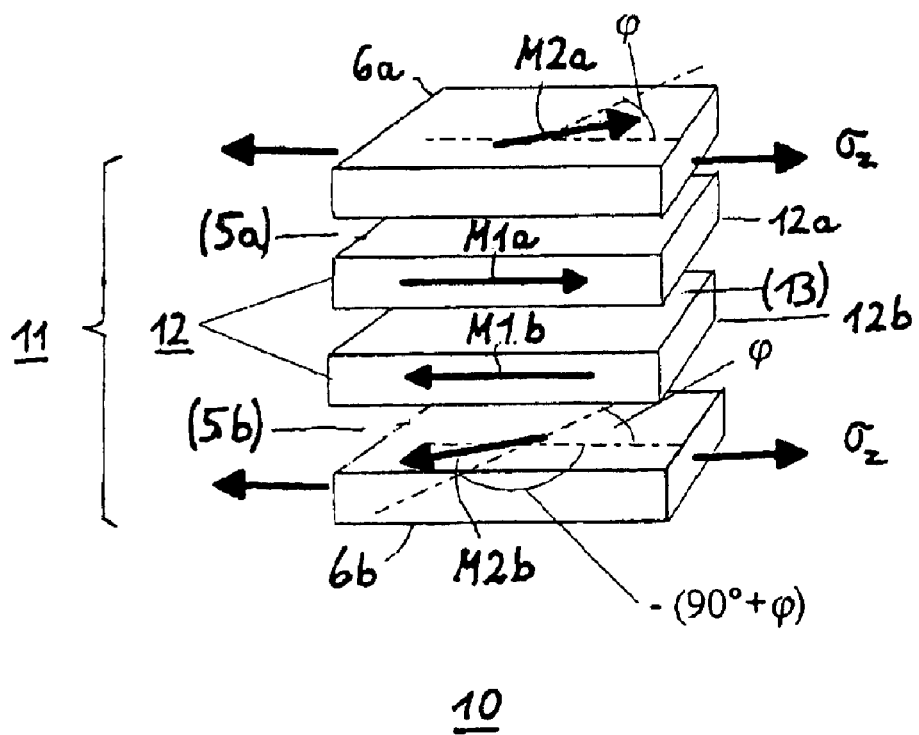
FIG. 8 shows a further construction of a force sensor element of an inventive sensor device.

If pursuant to FIG. 8, for a TMR force sensor element 10, one provides a thin layer system 11 where on both sides (above and below) of a reference layer a respective detection layer 6a or 6b, separated by a tunnel barrier layer 5a or 5b, the starting position of the magnetization M2a or M2b in the two detection layers can be respectively established in the direction of $\emptyset$ or $-(90°+\emptyset)$ of the axis. If one additionally also uses as a reference layer a reference layer system 12 in the form of a synthetic anti-ferromagnet (see WO 94/15223 A), there ideally results in the tube detection layer 6a and 6b a direction of magnetization of Ø or 180°+Ø[=−(90°+Ø)], if Ø=0° is in the direction of the magnetization M1a of the first ferromagnetic individual layer 12a of the synthetic anti-ferromagnet, and the Ø=180° is the direction of the magnetization M1b of the second ferromagnetic individual layer 12b of the synthetic anti-ferromagnet that is anti-ferromagnetically coupled by a coupling layer 13 of non-magnetic material.

Furthermore, by crossing TMR force sensor elements on the front and back side of a reference layer, bridges can be produced via which the signal of an individual element can be linearalized. A particular characteristic of the TMR effect is that this effect has a cosine (cos) dependency upon the intermediate angle; in other words, the greatest change, which approaches linear, results where the magnetization of the detection layer is at an angle of ±90° to the reference layer. As explained previously, however, in this orientation the angle change, due to the magnetostriction, is only minimally sensitive or sensitive only for one sign of the tension. If an angle of between 0° and ±90° is established in the detection layer, although one obtains a sensitivity for both signs of the tension, the linearity is adversely affected. By crossing a plurality of TMR sensor elements to form a bridge, it is possible to linearalize the overall signal in a known manner.

In general, the sensitivity of an inventive sensor device, using each type of TMR or sensor elements indicated in FIGS. 3 to 8, can be improved by crossing a plurality of such sensor elements to form a bridge. In this connection, the change of the sensor signal in one branch of the bridge due to external mechanical stresses can be compensated for by a current impressed from the outside. A so-called zero deviation balance is then undertaken. In addition, by variation of an impressed current, and of the magnetic field produced thereby, the magnetization M2 of the detection layer can again be rotated into the original state (=starting state). The current necessary for this purpose is in a first approximation proportional to the angle change and hence is directly correlated with the magnitude of the tension that is to be measured.

It is to be understood that a sensor device pursuant to the invention functions analogously to the illustrated embodiments if the magnetostriction constant of its at least one detection layer of its TMR or sensor element has a negative sign.

The specification incorporates by reference the disclosure of German priority document 103 19 319.7 filed Apr. 29, 2003.

The present invention is, of course, in no way restricted to the specific disclosure of the specification and drawings, but also encompasses any modifications within the scope of the appended claims.

What is claimed is:

1. A sensor device for detecting a force that acts in a prescribed direction of force, comprising:

a tunnel-magnetoresistive sensor element, as a force sensor element, which is provided with a thin layer system comprising: a detection layer of magnetic material having a magnetostriction coefficient $\lambda$, where $\lambda \geq |5 \cdot 10^{-6}|$; a comparatively magnetically harder reference layer or a corresponding reference layer system; an intermediate layer of insulating material, as a tunnel barrier, disposed between said detection layer and said reference layer or layer system; and electrical connections on said reference layer or reference layer system and on said detection layer, wherein in said detection layer a starting magnetization is established that relative to a magnetization of said reference layer or reference layer system, which is directed at least approximately in the direction of force, forms an angle of other than 0°, so that said starting magnetization of said detection layer is rotated out of a starting position under the effect of the force, wherein the starting magnetization of the detection layer is established by magnetic pre-stressing of the detection layer.

2. A sensor device according to claim 1, wherein said detection layer is made of a magnetic material having a magnetostriction coefficient $\lambda$, where $\lambda \geq |5 \cdot 10^{-5}|$.

3. A sensor device according to claim 1, wherein said angle has a value of at least approximately 90°.

4. A sensor device according to claim 1, including a plurality of tunnel-magnetostrictive sensor elements in a bridge connection.

5. A sensor device according to claim 1, wherein said detection layer has a multi-domain condition.

6. A sensor device according to claim 1, including a magnetic pre-tensioning of said detection layer.

7. A sensor device according to claim 1, wherein said thin layer system of said tunnel-magnetostrictive sensor element, on both sides of said reference layer or reference layer system, has a respective detection layer wherein said detection layers are spaced apart by a tunnel barrier layer.

8. A sensor device according to claim 7, which includes a reference layer system having two magnetic layers and a non-magnetic intermediate layer disposed between said two magnetic layers, wherein magnetizations in said magnetic layers are oriented anti-parallel to one another.

9. A sensor device according to claim 1, wherein said detection layer has an at least approximately single-domain condition.

10. A sensor device according to claim 9, including a ferromagnetic (Néel) coupling of said detection layer to said reference layer or reference layer system.

11. A sensor device according to claim 1, which includes at least one detection layer that contains at least one of the group consisting of cobalt, iron and nickel.

12. A sensor device according to claim 11, wherein the material of said detection layer has an amorphous structure.

13. A sensor device according to claim 1, wherein said angle has a value of less than 90°.

14. A sensor device according to claim 13, wherein said angle has a value between 75° and 15°.

15. A sensor device according to claim 14, wherein said angle has a value of at least approximately 45°.

* * * * *